United States Patent [19]
Anderson et al.

[11] 3,884,611
[45] May 20, 1975

[54] EXTRUSION DIE

[75] Inventors: John W. Anderson; John J. Barney; James J. Flanagan; Vernon Krupa, all of Chippewa Falls, Wis.

[73] Assignee: Leesona Corporation, Warwick, R.I.

[22] Filed: Oct. 24, 1973

[21] Appl. No.: 409,305

[52] U.S. Cl. ............... 425/376; 425/461; 425/466
[51] Int. Cl. ............................................. B29f 3/00
[58] Field of Search .......... 425/461, 466, 465, 380, 425/376, 381

[56]       References Cited
         UNITED STATES PATENTS
1,715,859   6/1929   Norton ............................. 425/466
3,162,896   12/1964  Seubert ............................ 425/466
3,241,183   3/1966   Tyrner ............................. 425/466
3,293,689   12/1966  Chiselko et al. ................... 425/466
3,377,655   4/1968   Kucharski et al. .................. 425/466
3,480,998   12/1969  Erdberg ........................... 425/381 X FOREIGN PATENTS OR APPLICATIONS
1,072,378   1959   Germany ............................. 425/381

*Primary Examiner*—Francis S. Husar
*Assistant Examiner*—Mark Rosenbaum
*Attorney, Agent, or Firm*—Robert J. Doherty

[57]            ABSTRACT

A novel construction of an extrusion die is disclosed wherein an integral portion of one of the die segments which defines a flow channel is deformable in such a manner so as to provide dimensional changes in such flow channel along the width thereof. Adjustment means are also provided so that the dimensional alterations may be controlled along the width of the die in such a manner so as to control the flow of thermoplastic material therethrough.

11 Claims, 5 Drawing Figures

EXTRUSION DIE

BACKGROUND OF THE INVENTION

The present invention relates to a slot type extrusion die for the extrusion of thermoplastic sheet, film, strand, strip, etc. Such extrusion dies are presently known and generally include an entrance for the extrudate into the die assembly itself, a manifold area for the distribution of the thermoplastic material within the die and an exit slot or slots whereby the ultimate shape of the thermoplastic material or extrudate is determined as it emerges from the die. With such die constructions it is generally necessary to equalize the pressure drop through the die so as to assure that an equal amount of thermoplastic material is delivered along the full length of such where desirable.

To equalize the pressure drop and thereby the extrudate flow emerging from the die lips it is common to provide a slot having a varied dimension across its width to compensate for the inherent unequal pressure distribution in the manifold. This type of die construction is generally called a "coat hanger" die and is in wide spread use because of its simplicity and resultant low cost. Such "coat hanger" dies are however, necessarily of a particular fixed dimension and therefore useful for a very limited range of thermoplastic materials generally dependent on the flow and viscosity ranges of such materials and on extrusion conditions. Thus such die constructions cannot meet the need for large changes in flow characteristics that would be presented by a wide range of polymers and as such would necessitate actual changes in the particular fixed dimensions thereof.

Another commonly utilized mechanism to overcome the above mentioned distribution deficiencies is that of the die having an adjustable dam or choker bar construction. In such devices an adjustable valve mechanism in the form of an adjustable bar is used to create a differential pressure drop across the width of the die. Although satisfactory for many applications this restrictor or choke bar construction has several serious limitations and disadvantages. Initially the width of the restrictor bar which forms a portion of the flow channel for the thermoplastic material must necessarily be narrow e.g. in the order of one or two inches, since to provide a wider bar would necessarily entail the use of extremely heavy and thus costly overall die construction and adjustment devices in order bend the bar into the flow path of the polymer in order to equalize the pressure drop and resultant flow thereacross. Inasmuch as the bar must therefore operate over a short length in the flow channel, that is, length in the flow direction of the polymer, its penetration thereinto must be proportionately greater than is desirable in many situations. This penetration of the bar into the flow path of the extrudate must be made abruptly and thus present protruding or undercut portions where polymer may hang up and heat degradate. Such constructions further require costly machining necessitated by the high tolerances required between the bar and the adjacent portions of the die to prevent or at least reduce gross leakage of polymer therebetween.

In accordance with the present invention, a die construction is presented wherein an actual portion of the die body itself is adjustably deformable so as to vary the cross sectional configuration and cross sectional dimensions of the extrudate channel and thus provide a novel means whereby the pressure drop and thus the resultant polymer flow may be distributed across the exit portion of the die in a manner that avoids the above described undesirable characteristics of known devices.

OBJECTS OF THE INVENTION

It is an object of the present invention to provide an extrusion die construction wherein an integral portion of a die segment in part defining a flow distribution path is deformable so as to vary the cross sectional dimension of such path and thus serve as a control over the polymer flow therethrough.

Another object of the present invention is to provide a die configuration having a body portion thereof in the pre-land area adjustably deformable over a relatively large proportion of the length of the pre-land area so that small dimensional changes therein are effective over a greater length of the flow path than hereto before possible and thus providing necessary pressure distribution without the prior art disadvantages indicated.

Another object of the present invention is to provide a die construction which provides dimensional adjustability of the polymer flow path while avoiding any abrupt dimensional changes in such path of known prior art devices, which undesirably present potential areas for die wear, leakage and polymer hangup leading to polymer degradation.

These and other objects of the invention will be brought out in the following descriptive portions of the application:

DESCRIPTION OF THE PREFERRED EMBODIMENT

Figure 1:
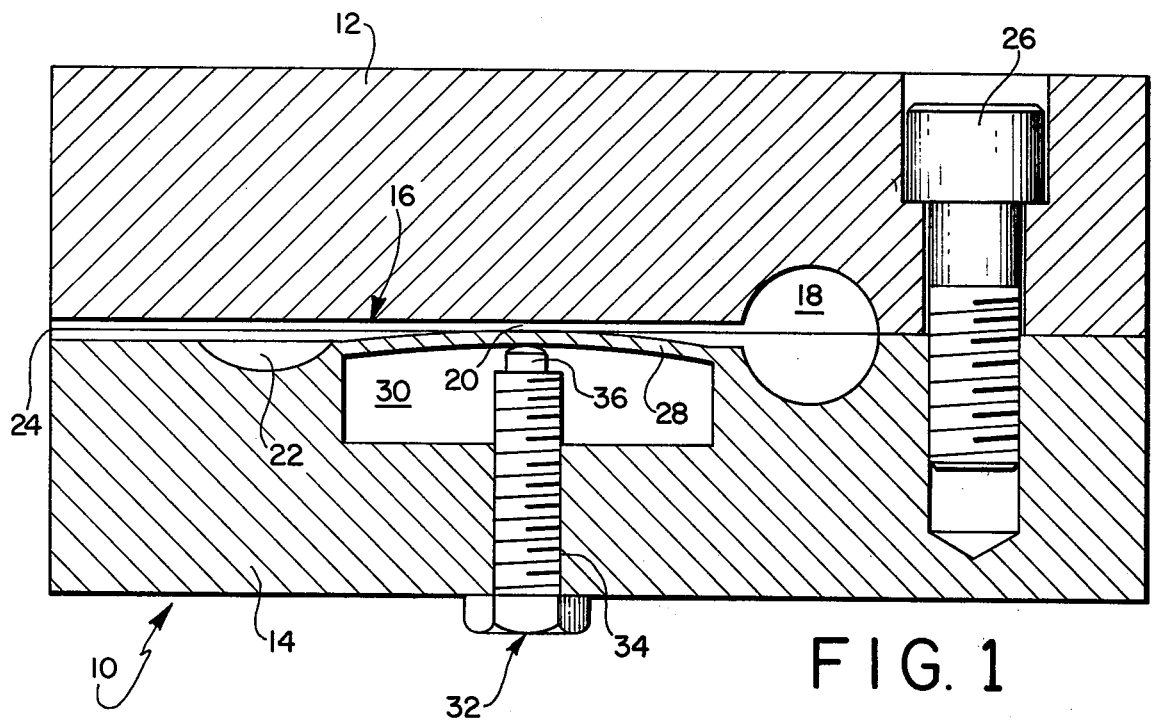
FIG. 1 is a cross sectional view in stylized and simplified form of two die halves of an extrusion die wherein the flexible or adjustable body construction of the present invention is incorporated.
Figure 2:
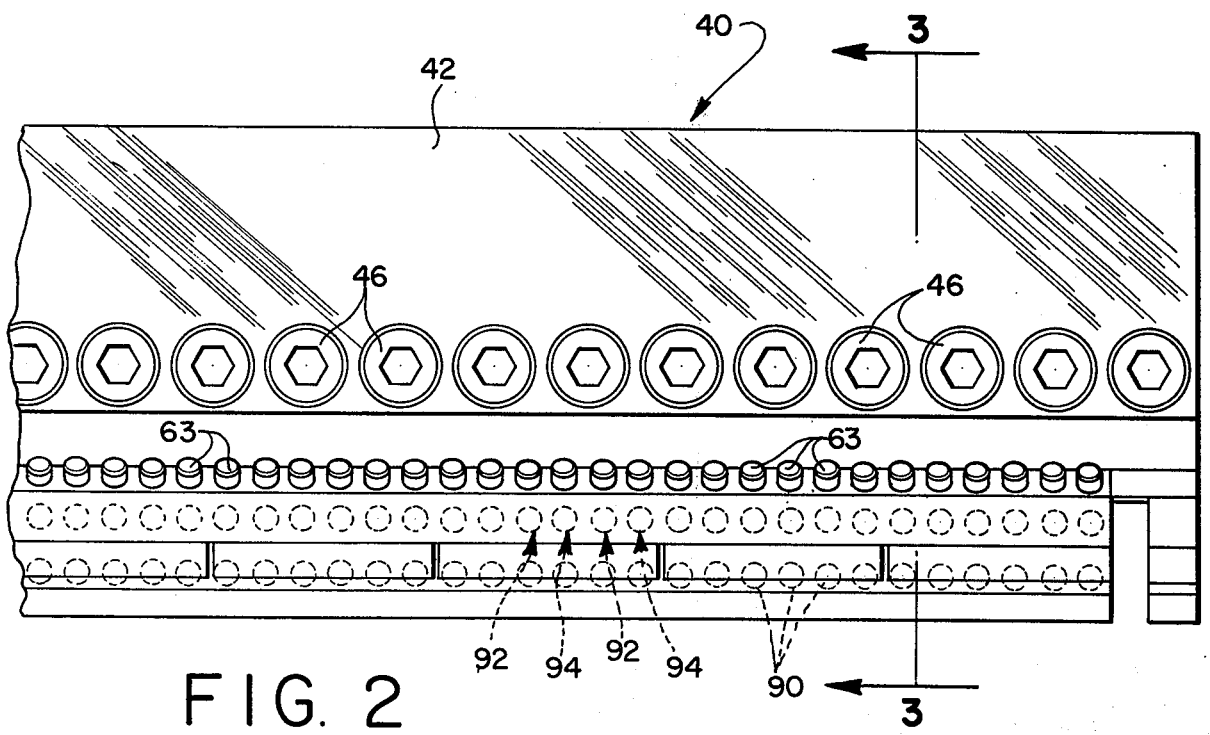
FIG. 2 is a partial top plan view of an extrusion die incorporating the present invention.

Turning now to the drawings in particular FIG. 1 thereof, there is shown a schematic, illustration of a pair of die halves in section and showing the overall embodiment of the present invention. It should be brought out that although in the illustrations and descriptions of the invention reference will be made to an opposed pair of die sections that the invention is equally applicable to a plurality of die segments rather than an opposed pair or for that matter, a single die element where practical. Also the terms thermoplastic material, polymer and extrudate are used interchangeably throughout the following description. Therein a die 10 comprising upper and lower die components 12 and 14 respectively is shown. These die halves 12 and 14 are suitably formed or machined so as to present a plastic flow channel 16 of relatively thin flat configuration and in turn comprising a distribution manifold 18 connected with a supply of thermoplastic material e.g.

from an extruder head (not shown), a pre-land area 20, a secondary distribution or supply area 22 and an exit opening or slot 24 through which the thermoplastic extrudate emerges in final form, e.g. sheet, film, strand, etc. A series of spaced bolts 26 may be utilized to hold the die halves 12 and 14 together in the relationship shown.

The novel feature of the present invention is particularly illustrated by the use of a die segment 28 which in part forms the boundary of the pre-land portion of the channel 16. This segment 28 is a relatively thin walled construction and generally extends over the entire width of the die, that is to say, the entire width of the flow channel 16. The relative thinness of the segment 28 enables such to be deformed or distorted into or away from the pre-land 20 portion of the flow channel so as to reduce or increase the cross sectional configuration thereof and thus serve as a means by which the flow of material therethrough may be distributed so as to create an effective control on the emerging polymer extrudate from the slot 24. The segment 28 is preferrably formed as illustrated by the use of a channel 30 cut therebeneath to assure integrity and a resultant smooth uninterrupted flow path for the polymer to be extruded.

An adjusting mechanism 32 is illustrated in FIG. 1 as operative to decrease the cross-sectional dimension across the pre-land 20. Therein a bolt 34 having a pressure or pusher element 36 in abutting relationship to the underside of the segment 28 generally central thereof is threaded into the die body 14 in such a way that forward movement of bolt 34 distorts or deflects the segment 28 upwardly so as to partially reduce the dimension of the pre-land area 20 and thus restrict the flow of extrudate therethrough. It should be brought out that the adjusting means 32 may comprise pull means rather than push means which will serve to deflect the segment 28 downwardly as well. An important feature of the invention is that the deflection or distortion of the segment 28 is brought out over a relatively large area of the die, that is, that the relative dimensional changes are accomplished over a major or even substantially entirely along the pre-land area. This enables small changes in dimension to be effective across a relatively long dimension in the flow or longitudinal die direction thus magnifying the effectiveness of such dimensional changes in the form of a cumulative pressure drop thereacross. This enables a more effective measure of control over known devices such as choker bar configurations which necessarily operate over a minor portion of the pre-land area and thus must accomodate far larger dimensional changes in order to accomplish the same pressure drop. It should be brought out that the control aspects of the present invention in the form of a distortable portion of the die body itself also eliminates the need for a separate element protruding into the flow stream and thus eliminates potential area wherein a polymer might hangup and degrade or additionally leak from the die. Also a more gradual dimensional change is brought about within the pre-land area by reason of the deformation of an integral portion of the die itself than was heretofor known with prior art devices.

It is thus seen that the novel die construction of the present invention affords an effective method of flow control in a new and novel manner which avoids the disadvantages of prior art devices yet can be accomplished in a relatively inexpensive and easily maintained manner. Also inasmuch as the dimensional changes or control are effective over a greater length of the flow channel in the material flow direction thereof, dies of a particular gross dimension may be effectively used for a wider range of flow characteristics. This enables a die of a particular gross dimension constructed in the present novel manner to have utility over a wider range of polymers than would otherwise be possible. Furthermore, effective control is accomplished without the potential for polymer leakage or degradation.

Turning now to FIGS. 2–5 of the drawings, a more detailed and preferred embodiment of the invention is disclosed. Therein a segment of a die 40 is shown in plan view in FIG. 2 thereof. Die 40 is composed of die halves 42 and 44, positioned in relationship to each other by a series of bolts 46. Lower die half 44 is in turn backed-up or supported by a die plate 48. The die halves 42 and 44 are appropriately machined to form a polymer flow channel 50 through which thermoplastic polymer is extruded under pressure into a final form as determined by the shape of the die lips 52 and 54.

The upper die lip 54 may further be adjusted so that the final dimension of the material being extruded may be varied. Thus die lip 54 is integrally supported from the remaining portions of the upper portions 42 by a material web 56 of reduced thickness, appropriately machined and resulting in an enlarged channel 58. The support block 60 further partially defines such channel 58 and is provided with a series of bores 62 into which adjusting bolts 63 having threaded lower portions 65 are mounted. An adjustment block 64 is threadably engaged to the lower portion 65 of the adjustment bolt 63 which in turn is in abutting contact with upper portions 66 of the lip 54. Such constructions are conventionally used to control the exact dimension of the product being extruded and are commercially available e.g. from the Johnson Division of Leesona Corporation, Chippewa Falls, Wisconsin under the trade mark designation FLEXLIP.

Figure 3:
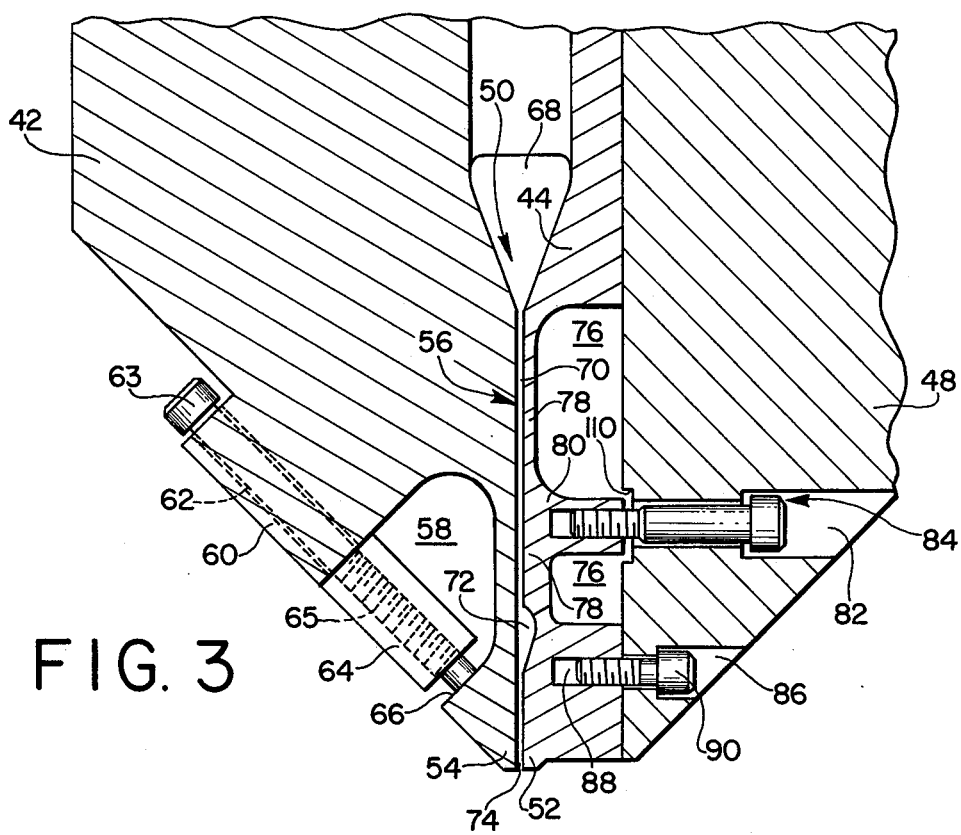
FIG. 3 is a sectional view of the die construction shown in FIG. 2 of the drawings taken along the line 2—2 thereof.

The flow channel 50 is best shown in FIG. 3 of the drawings comprises a manifold section 68, a pre-land portion or passage 70, a secondary distribution portion 72 and an exit slot 74. The lower die half 44 is provided with a cavity 76 so as to provide a pre-land segment 78 of relatively thin configuration so that such may be deformed so as to provide a possible controlled variance thereof of the cross-sectional configuration of the pre-land portion 70 of the channel 50. A portion of the pre-land segment 78 is provided with a downwardly extending boss 80 running the length thereof. The lower die half 44 is in turn provided with a backing plate 48 which is in turn provided with a series of bores 82 for receipt of suitable adjustment means 84 as will hereinafter be more fully brought out. The backup plate 48 is further provided with a series of bores 86 forwardly or in the downstream direction of bores 82. The bores 86 further communicate with corresponding threaded bores in the lower die half 88. A plurality of bolts 90 are utilized in positioning of the lower die half 44 and backup plate 48 as shown and are used for holding the lip 52 in a fixed position and to maintain the exit slot 74 in a constant opening when the pre-land opening 70 is modified.

The adjustment means for controlling the change in the cross sectional configuration of the pre-land passage 70 of the channel 50 comprises a series of separate adjustment elements 92 and 94 positioned in alternating relation along substantially the entire width of the die. Thus in this preferred form of the invention the pre-land segment 78 of the die half 44 may be distorted or deformed upwardly towards the upper die cavity 42 at alternating positions across the width of the die. Similarly, adjustment elements 92 may be used to pull the deformable pre-land section 78 away from the upper die 42 in alternating positions across the entire width of the die. The desired adjustment of flow normally is brought about by the adjustment of all or as many as necessary of one or the other type adjustment device, that is, by adjustment of the pull type mechanisms 92 or by adjustment of all or as many as are necessary of the push type adjustment devices 94. However, there may be times where adjustment of both push and pull type mechanisms may be had at the same time, i.e. to form a slightly wavy configuration to the pre-land area.

It should be pointed out that the preferred alternative positioning of the adjusting devices need not be pull, push, pull push, etc. but may be push, push, pull, push, push, pull etc. or other alternative arrangements or series as dictated by the overall cross-sectional pre-land passage configuration desired. It is further conceivable that all the adjustment means may be of a single type or even that only one single adjustment means of either type may be effectively used in some installations.

Figure 4:
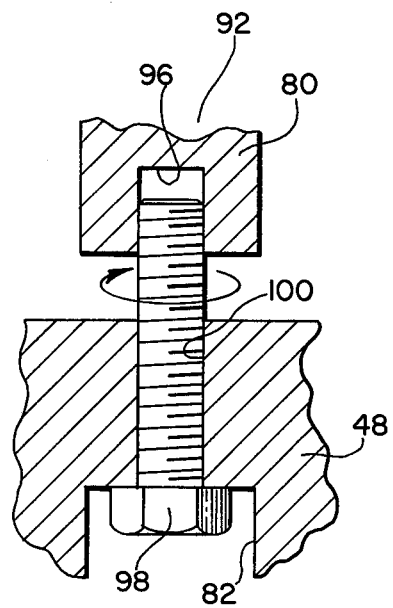

Turning now to FIG. 4 of the drawings, the details of a mechanism for accomplishing pull type adjustment is shown. Therein a bore 96 is provided within the boss portion 80 and is appropriately threaded for receipt of a threaded bolt 98 which in turn is received in unthreaded bore 100 through the backup plate 48. As will be seen, counter clockwise revolution of the bolt will exert force through the threaded connection in a downward direction on the boss 80 and thus in turn exert a downward force upon the pre-land segment 78.

Figure 5:
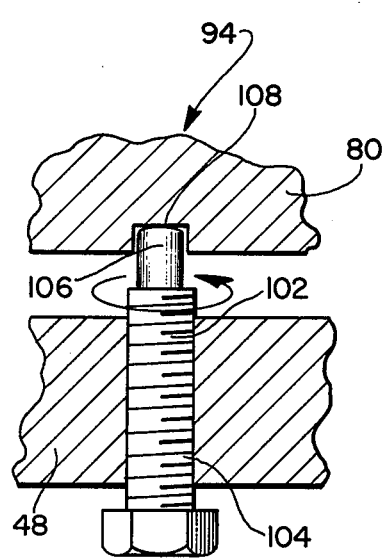
FIGS. 4 and 5 are enlarged partial sectional views showing respectively the adjustment means for reducing the cross sectional dimensions of the polymer flow path and the adjustable means for increasing such path.

The push adjustment mechanism 94 as shown in FIG. 5 comprises a threaded bolt 102 received within a bore 104 within the backup plate 48. The forward end of the bolt 102 is provided with a blunt pusher element 106 which is in turn received within a bore 108 provided within boss 80. Thus as can be seen, clockwise motion of the bolt 102 forces the bolt upwardly against the boss 80 and thus exerts a distortion of the pre-land area 78 so as to restrict or lessen the cross sectional dimension of the pre-land passage 70.

Adjustment of the push or pull adjustment devices 92 and 94 respectively may require appropriate readjustment of bolts 90 to either provide a positive contact and positioning between the lower die 44 and its backup plate 48 or alternatively provide for a slight amount of give to relieve any tensions built up between the interface of the aforementioned members. A channel 110 is provided within the backup plate 48 so as to permit downward adjustment of the boss 80 prior to contact with the plate.

What is claimed is:

1. A die for the extrusion of thermoplastic materials comprising
   a plurality of die components defining an internal plastic flow distribution channel of relatively thin flat configuration, said channel being upstream and removed from the exit portion of said die,
   one of said die components having an integral segment thereof adjacent said channel and in part defining said channel so as to insure a smooth uninterrupted flow path,
   said segment deformable so as to modify the cross-sectional configuration of said channel upstream of said exit portion a distance to produce significant thermoplastic material flow control effective at said exit portion and
   means for deforming said segment.

2. The die construction of claim 1 wherein said segment is deformable substantially entirely across the width of said channel.

3. The die construction of claim 2 wherein said means for deforming said segment comprises a plurality of individual adjusting means for either moving associated portions of said segment towards said channel to reduce its cross-section or away from said channel to increase its cross-section.

4. The die construction of claim 3 wherein said individual adjusting means are positioned in alternating relationship to each other substantially entirely across the width of said channel.

5. A die for the extrusion of thermoplastic materials comprising,
   a plurality of die components defining a plastic flow channel,
   said plastic flow channel having an entrance portion, a distribution portion and an exit slot portion,
   said distribution portion being generally of relatively thin flat configuration,
   one of said die components having an integral segment thereof adjacent said channel and in part defining said distribution portion so as to insure a smooth uninterrupted flow path,
   said segment deformable so as to modify a portion of the cross-sectional configuration of the distribution portion of said channel upstream of said exit portion a distance to produce significant thermoplastic material flow control effective at said exit portion without modifying the exit slot portion thereof, and
   means for deforming said segment.

6. The die construction of claim 5 wherein said distribution portion includes a manifold portion, a pre-land portion and a secondary distribution portion and wherein the cross-sectional configuration of said pre-land portion is variable by means of said deformable die segment.

7. The die construction of claim 6 wherein that portion of said die segment in part forming said pre-land portion of said channel is of relatively thin construction.

8. The die construction of claim 7 wherein said pre-land die segment portion includes a downwardly extending boss positioned intermediate the flow directional extent of said pre-land die segment portion, and wherein said means for deforming said segment operates on said boss.

9. The die construction of claim 5 wherein said segment is deformable substantially entirely across the width of said distribution portion of said channel.

10. The die construction of claim 9 wherein said means for deforming said segment comprises a plurality of individual adjusting means for either moving associated portions of said segment towards said channel to reduce its cross-section or away from said distribution portion of said channel to increase its cross-section.

11. The die construction of claim 10 wherein said individual adjusting means are positioned in alternating relationship to each other substantially entirely across the width of said distribution portion of said channel.

* * * * *